(12) United States Patent
Hilty

(10) Patent No.: US 11,993,127 B2
(45) Date of Patent: May 28, 2024

(54) ROLL STABILIZER ASSEMBLY

(71) Applicant: Schaeffler Technologies AG & Co. KG, Herzogenaurach (DE)

(72) Inventor: Drew Hilty, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/580,252

(22) Filed: Jan. 20, 2022

(65) Prior Publication Data

US 2023/0226876 A1  Jul. 20, 2023

(51) Int. Cl.
*B60G 21/10* (2006.01)
*B60G 21/055* (2006.01)

(52) U.S. Cl.
CPC .................... *B60G 21/10* (2013.01)

(58) Field of Classification Search
CPC .... B60G 21/10; B60G 21/106; B60G 21/055; B60G 21/0553; B60G 21/0556; B60G 21/0558; B60G 2400/98; B60G 2202/135; B60G 2206/427; B60G 2206/201
See application file for complete search history.

(56) References Cited

U.S. PATENT DOCUMENTS

| | | | | |
|---|---|---|---|---|
| 11,292,514 | B2* | 4/2022 | Diffin | B21B 1/22 |
| 2006/0017251 | A1 | 1/2006 | Taneda | |
| 2013/0291664 | A1* | 11/2013 | Freund | B60G 21/0556 74/89 |
| 2018/0355952 | A1* | 12/2018 | Honda | F16H 55/088 |
| 2019/0184784 | A1 | 6/2019 | Park | |
| 2021/0283975 | A1* | 9/2021 | Cox | B60G 21/0553 |
| 2021/0394579 | A1 | 12/2021 | Jang | |
| 2023/0060076 | A1* | 2/2023 | Kraus | B60G 21/0556 |

FOREIGN PATENT DOCUMENTS

| | | | | |
|---|---|---|---|---|
| DE | 102009039479 A1 | * | 3/2010 | ......... B60G 21/0551 |
| DE | 102009034849 A1 | * | 2/2011 | ......... B60G 17/0185 |
| DE | 202013105441 U1 | * | 4/2015 | ........... B60G 21/055 |
| DE | 102020114090 A1 | * | 3/2021 | ......... B60G 21/0556 |
| GB | 2220625 A | * | 1/1990 | ........... B60G 21/055 |
| JP | 2000289427 A | | 10/2000 | |
| KR | 20170059225 A | * | 5/2017 | |
| WO | 2019180824 A1 | | 9/2019 | |

* cited by examiner

*Primary Examiner* — Jason D Shanske
*Assistant Examiner* — Daniel M. Keck
(74) *Attorney, Agent, or Firm* — Volpe Koenig

(57) ABSTRACT

An anti-roll bar assembly comprising a disconnect assembly element defining a first one of a male or female connector, and a shaft defining a second one of a male or female connector is disclosed. The disconnect assembly element and the shaft are fixed to each other via the male and female connectors without the need for any welding connection.

18 Claims, 4 Drawing Sheets

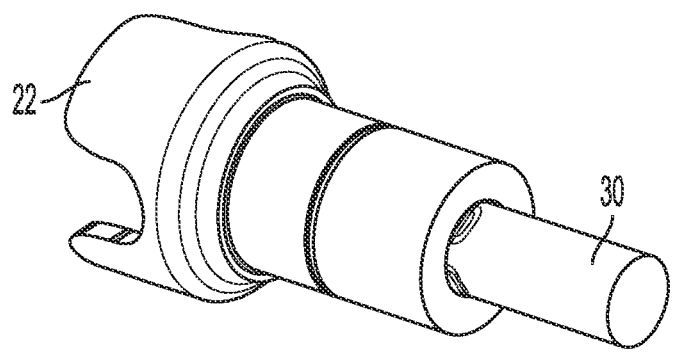
FIG. 3
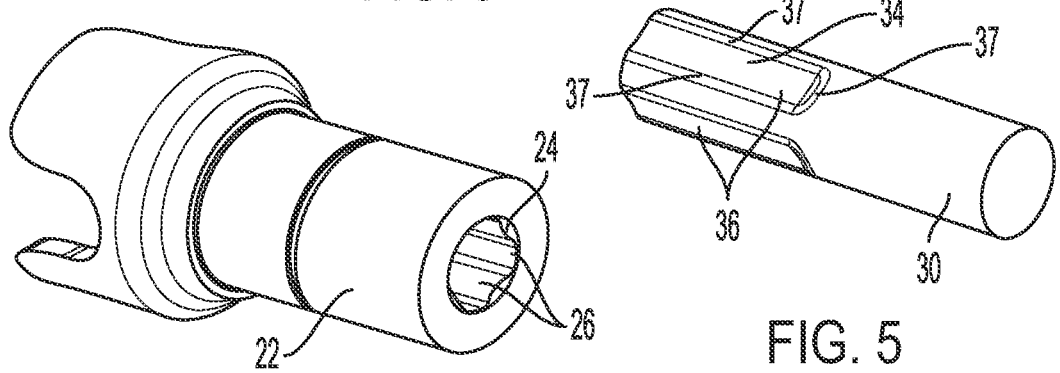
FIG. 4
FIG. 5

ROLL STABILIZER ASSEMBLY

FIELD OF INVENTION

The present disclosure relates to a roll stabilizer assembly, and is more particularly related to a connection arrangement for a roll stabilizer assembly.

BACKGROUND

Anti-roll bar assemblies are well known. One type of anti-roll bar assembly includes a disconnect assembly or configuration in which the connection between adjacent roll bar sections can be selectively adjusted or modified. Connecting roll bar sections to the disconnect assembly elements present issues with respect to cracking, are expensive to form, and/or are labor intensive.

It would be desirable to provide a durable connection method for an anti-roll bar assembly including a disconnect assembly.

SUMMARY

An improved anti-roll bar assembly is disclosed herein. The assembly includes a disconnect assembly element defining a first one of a male or female connector, and a shaft defining a second one of a male or female connector. The disconnect assembly element and the shaft are fixed to each other via the male and female connectors.

In one aspect, the shaft includes the male connector and the disconnect assembly element includes the female connector. The male connector and the female connector can each include at least two mating regions that are complementary to each other. In another aspect, the male connector and the female connector each include four mating regions that are complementary to each other. As used in this context, the term complementary means two elements have a matching or mating profile or geometry.

The disconnect assembly element can comprise a cup-shaped housing element. The disconnect assembly element could be another shape or could be formed as another portion of the disconnect assembly.

A connection between the disconnect assembly element and the shaft can be provided via a press fit connection. The shaft can be configured to be received within a portion of the disconnect assembly element. In one aspect, a depth (d) of the male connector into the disconnect assembly element is at least 25% of an entire axial extent (D) of the disconnect assembly element.

The disconnect assembly element and the shaft are configured to be connected to each other manually, without the need for an additional fixation or fastening elements or configurations, such as welding.

A method of forming an anti-roll bar assembly is also provided herein. The method includes providing a disconnect assembly element defining a female connector, and a shaft defining a male connector. The method includes connecting the disconnect assembly element with the shaft via a press fit connection between the male and female connectors. The male connector and the female connector can each include at least two mating regions that are complementary to each other.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 3 is a magnified perspective view of an interface between a shaft and a portion of the disconnect assembly.

FIG. 4 is a perspective view of the portion of the disconnect assembly of FIG. 3.

FIG. 5 is a perspective view of the shaft of FIG. 3.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
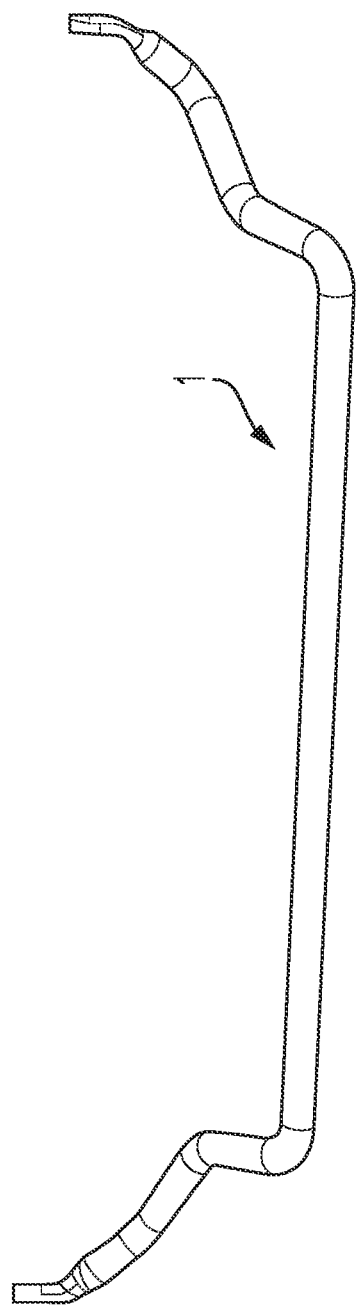
FIG. 1 is a perspective view of a roll stabilizer bar assembly without a disconnect assembly.

As shown in FIG. 1, an anti-roll bar assembly 1 is provided that lacks any disconnect assembly. Since this anti-roll bar is solid, it is not adjustable depending on terrain the vehicle is scaling. The stiffness of the assembly is constant, and therefore the performance of the anti-roll bar assembly 1 will be constant.

Figure 2:
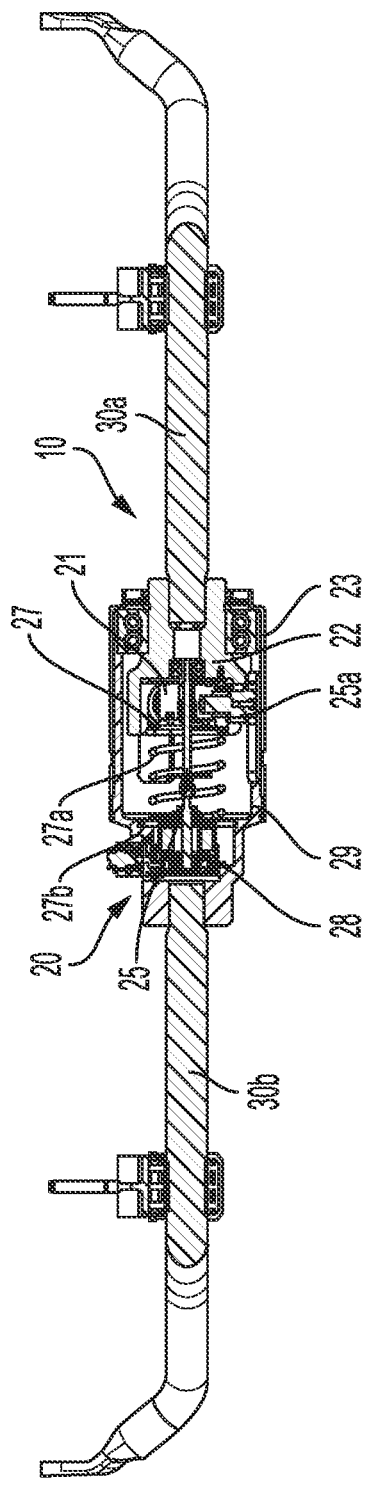
FIG. 2 is a cross-sectional view of a roll stabilizer bar assembly with a disconnect assembly.

FIG. 2 illustrates a modified anti-roll bar assembly 10 in which a disconnect assembly 20 is provided. One of the functions provided by the disconnect assembly 20 is to provide the vehicle operator the ability to adjust the stiffness of the suspension dependent upon varying terrain (i.e. flat highway versus rock climbing). Since this disconnect assembly 20 is electronically controlled within the vehicle, the operator can adjust the disconnect setting to obtain the desired feel of the suspension.

As shown in FIG. 2, in one aspect, the disconnect assembly 20 includes a housing 29 and housing cover 23 that generally define an interior space or cavity. Within the disconnect assembly 20, a ball screw motor 28 is configured to selectively engage a ball screw 25. The ball screw 25 is engaged with a ball screw hub 21 which is also engaged by a ball screw pin 25*a*, and selectively provides a disconnecting or connecting arrangement between the two shafts 30*a*, 30*b*. An axial spring 27*a* is also arranged within the disconnect assembly 20 and is configured to engage against a spring end plate 27 on one end (i.e. ball screw end) and against the spring support plate 27*b* on another end (i.e. motor end). One of ordinary skill in the art would understand that additional components, such as bearings, plates, and other elements can be arranged within the disconnect assembly 20.

The assembly 10 also includes at least one shaft 30 that is connected to the disconnect assembly 20. As shown in FIG. 2, two shafts 30*a*, 30*b* can be provided, with one on each side of the disconnect assembly 20. The shaft 30 can be formed as an anti-roll bar section. The ends of the shafts 30a, 30b can each be connected to a wheel suspension.

There are known issues with providing the connection between the shafts 30 on either side of the disconnect assembly 20 with the respective ends of the disconnect assembly 20. The connection arrangement disclosed herein can be adapted to function with either end of the disconnect assembly 20, and can be integrated with both shafts 30a, 30b connected to the disconnect assembly 20, as shown in FIG. 2.

The disconnect assembly 20 can be configured to selectively provide a connection or modify a connection between two anti-roll bars or shafts. In particular, the disconnect assembly 20 can include a disconnect assembly element 22, which can be arranged within the housing cover 23. The disconnect assembly element 22 can be formed as a cup-shaped housing element or tulip-shaped component. The disconnect assembly element 22 can include an opening with a contour configured to receive a roller bearing of the disconnect assembly 20 and can be configured for selective engagement and disengagement with any portion of the disconnect assembly. The contour of the disconnect assembly element 22 can be profiled to optimize the contact stress in contact area 38. The purpose of an optimized profile in contact area 38 is to improve component life by reducing stress in the disconnect assembly element 22 and the ball screw pin 25a. This allows for easy engagement and disengagement of the ball screw pin 25a into the disconnect assembly element 22. As shown in FIG. 2, the disconnect assembly element 22 is configured to receive the ball screw pin 25a to transition the anti-roll bar assembly between engaged and disengaged modes. The ball screw pin 25a can be extended or retracted relative to the disconnect assembly element 22 to selectively provide a connection between shafts 30a and 30b. In one aspect, the ball screw pin 25a is threaded into the ball screw hub 21, and the combination of the ball screw pin 25a and the ball screw hub 21 can be configured to move axially along the ball screw 25.

Male and female connectors or connection elements are generally provided to join the disconnect assembly 20 to the shaft 30. In one aspect, the shaft 30 includes a male connector 34 and the disconnect assembly 20 includes a female connector 24. One of ordinary skill in the art would understand that this configuration could be reversed or modified.

In one aspect, the male connector 34 includes at least one mating region or portion 36, and the female connector 24 includes an opening with at least one mating region or portion 26. In one aspect, the male connector 34 includes four mating regions or portions 36, and the female connector 24 includes an opening with four mating regions or portions 26. One of ordinary skill in the art would understand that the geometry of the male and female connectors can vary.

In one aspect, the mating regions 36 on the male connector 34 can be formed as flat areas of deposited or raised material, or curved areas of deposited or raised material that have a different curvature than a remainder of the shaft 30. Ramp regions 37 (i.e. radii elements) can be provided that define a transition region between a base rounded portion of the shaft 30 and the mating regions 36. In one aspect, the ramp regions 37 can be defined on every side of the mating regions 36 other than the end defining the terminal end of the shaft 30. Alternatively, the ramp regions 37 can be defined on just one side of the mating regions 36, or on every side of the mating regions 36 if the mating regions 36 are positioned axially inward from a terminal end of the shaft 30. The ramp regions 37 act as a transition region between the mating area 36 and the main round body of element 30. The ramp regions 37 are configured to limit potential stress concentrations. The present configuration maximizes the contact area of the male connector 34 into the female connector 24, and provides increased strength for the resulting joint. In another aspect, the mating regions 36 are formed as machined portions that are flattened relative to the round portion of the shaft 30 or have a different curvature from the round portion of the shaft 30. One of ordinary skill in the art would understand that the method of forming the mating regions 36 can vary. The mating regions 36 could be created via a forging operation or by machining to create a transition or connection between the mating regions 36 and the ramp regions 37. Additionally, the mating regions 26 on the female connector 24 can similarly be formed or machined.

Figure 7:
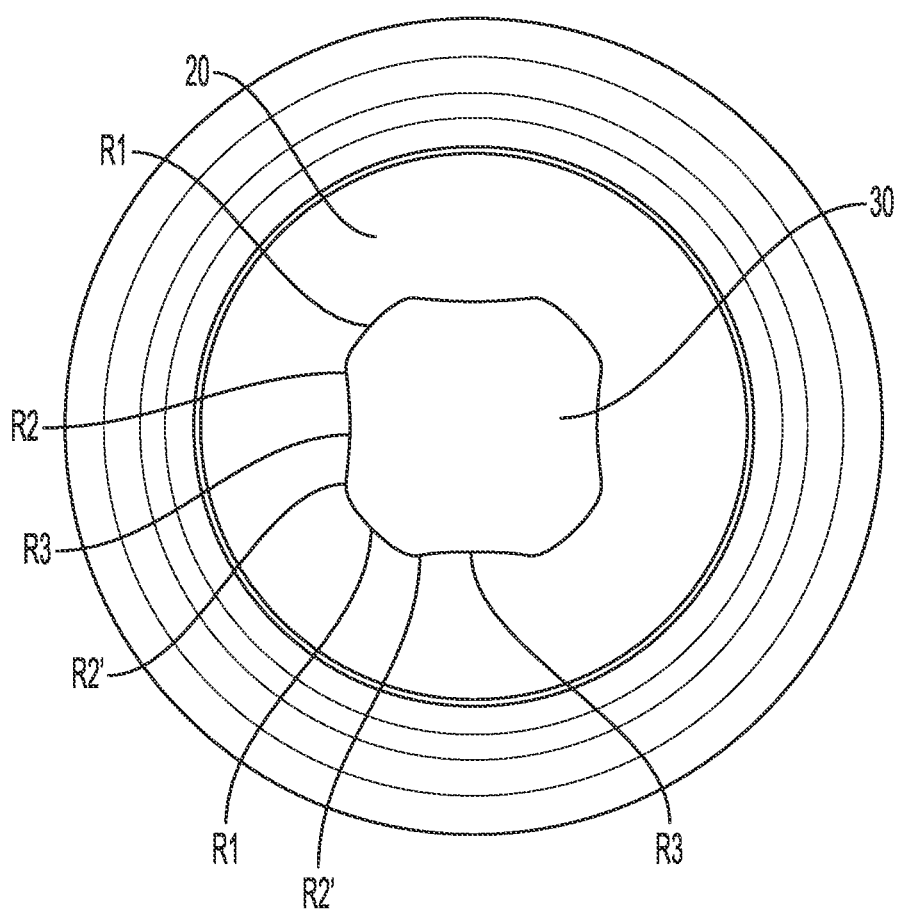
FIG. 7 is a cross-sectional view showing an interface between the shaft and the disconnect assembly.

FIG. 7 illustrates a detailed profile for the interface between the disconnect assembly 20 and the shaft 30. In FIG. 7, region (R1) corresponds to a round portion of the shaft 30. This region (R1) reflects the ordinary geometry of a rounded shaft. Region (R2) corresponds to a first ramp region 37 directly adjacent to region (R1). Region (R3) corresponds to the mating region 36 adjacent to the first ramp region 37. Region (R2') corresponds to a second ramp region 37 directly adjacent to region (R3). One of ordinary skill in the art would understand that the interface profile repeats with another region (R1) for the round portion of the shaft 30, etc. The profile of the female connector 24 on the disconnect assembly element 22 has a profile that matches the profile of the male connector 34 on the shaft 30.

In one aspect, regions (R3) can correspond to a non-flat profile that has a curvature different than the curvature of regions (R1). One of ordinary skill in the art would understand that any non-continuous and constant round profile could be used to provide the connection between the profiles of the shaft 30 and the disconnect assembly element 22.

The disconnect assembly 20 and the shaft 30 can be joined or connected to each other via a press fit connection. In particular, the press fit connection provided between the components ensures a reliable, durable, and cost-effective connection arrangement. In one aspect, the connection between the components can be achieved or provided via manual effort from a user and without any special tools, heating elements, welding, etc.

In another aspect, the portion including the male connector 34 can be formed on a sleeve that is separate from the shaft 30. Accordingly, the sleeve can be inserted around the shaft 30 and provide a press fit arrangement for the disconnect assembly 20.

A method of forming an anti-roll bar assembly 10 is also disclosed herein. The method includes providing a disconnect assembly element 22 defining a female connector 24, and a shaft 30 defining a male connector 34, and connecting the disconnect assembly element 22 with the shaft 30 via a press fit connection between the male and female connectors 24, 34.

Figure 6:
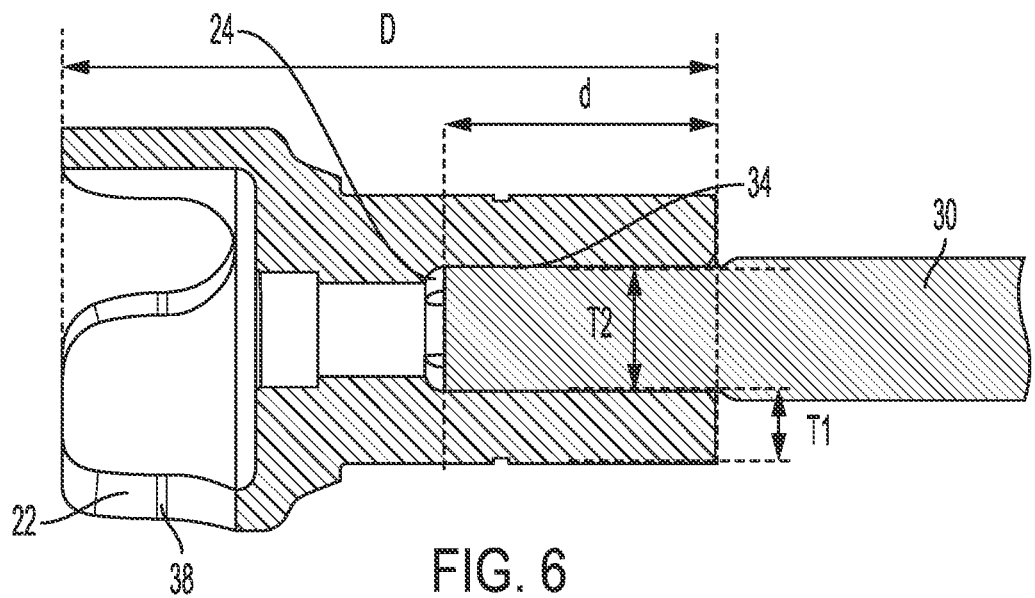
FIG. 6 is a magnified cross-sectional view of the interface between the portion of the disconnect assembly and the shaft of FIGS. 2-5.

As shown in FIG. 6, a depth (d) of the male connector 34 into the disconnect assembly element 22 is at least 25% of an entire axial extent (D) of the disconnect assembly element 22. In one aspect, the depth (d) of the male connector 34 into the disconnect assembly element 22 is at least 40% of the entire axial extent (D) of the disconnect assembly element 22. One of ordinary skill in the art would understand that this value can vary.

In one aspect, a thickness (T1) of a wall of the disconnect assembly element 22 in a region of the connection to the shaft 30 is at least half of a thickness (T2) of the shaft 30 in the region of the connection to the disconnect assembly element 22.

The connection disclosed herein provides an improved interference fit and torsional connection, and also a reduction of noise, vibration, and harshness (NVH) and as compared to known connections.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS anti-roll bar assembly 1
anti-roll bar assembly 10
disconnect assembly 20
ball screw hub 21
disconnect assembly element 22
housing cover 23
female connector 24
ball screw 25
ball screw pin 25a
mating region 26
spring end plate 27
axial spring 27a
spring support plate 27b
ball screw motor 28
housing 29
shaft 30
male connector 34
mating region 36
ramp region 37
contact area 38

What is claimed is:

1. An anti-roll bar assembly comprising:
a disconnect assembly element defining a first one of a male or female connector; and
a shaft defining a second one of a male or female connector, wherein the disconnect assembly element and the shaft are fixed to each other via the male and female connectors;
wherein a connection between the disconnect assembly element and the shaft is provided via a press fit connection,
wherein the male and female connectors have mating non-circular cross-sectional profiles;
wherein at least one of the male or female connectors includes at least three flat sides; and
wherein the shaft includes the male connector and the disconnect assembly element includes the female connector, and the male connector includes a plurality of mating regions, and at least one ramp region is defined at a trailing axial end of each of the plurality of mating regions.

2. The assembly according to claim 1, wherein the male connector and the female connector each include four mating regions that are complementary to each other.

3. The assembly according to claim 1, wherein the disconnect assembly element comprises a cup-shaped housing element.

4. The assembly according to claim 1, wherein the shaft is configured to be received within a portion of the disconnect assembly element.

5. The assembly according to claim 1, wherein a depth of the male connector into the disconnect assembly element is at least 25% of an entire axial extent of the disconnect assembly element.

6. The assembly according to claim 1, wherein the disconnect assembly element and the shaft are configured to be connected to each other without welding.

7. The assembly according to claim 1, wherein the mating cross-sectional profiles are configured to provide the press fit connection.

8. The assembly according to claim 1, further comprising rounded corners between the flat sides.

9. The assembly according to claim 1, wherein the press fit connection is a continuous press fit connection.

10. An anti-roll bar assembly comprising:
a disconnect assembly element defining a female connector; and
a shaft defining a male connector, wherein the disconnect assembly element and the shaft are fixed to each other via a press fit connection between the male and female connectors;
wherein the male and female connectors have mating non-circular cross-sectional profiles;
wherein the shaft includes the male connector and the disconnect assembly element includes the female connector, and the male connector includes a plurality of mating regions, and at least one ramp region is defined at a trailing axial end of each of the plurality of mating regions.

11. The assembly according to claim 10, wherein the disconnect assembly element comprises a cup-shaped housing element.

12. The assembly according to claim 10, wherein the male connector and the female connector each include four mating regions that are complementary to each other.

13. The assembly according to claim 10, wherein the disconnect assembly element and the shaft are configured to be connected to each other without welding.

14. The assembly according to claim 10, wherein the shaft is configured to be received within a portion of the disconnect assembly element, and a depth of the shaft into the disconnect assembly element is at least 25% of an entire axial extent of the disconnect assembly element.

15. A method of forming an anti-roll bar assembly, the method comprising:
providing a disconnect assembly element defining a female connector, and a shaft defining a male connector; and
connecting the disconnect assembly element with the shaft via a press fit connection between the male and female connectors;
wherein the male and female connectors have mating non-circular cross-sectional profiles;
wherein at least one of the male or female connectors includes at least three flat sides; and wherein the shaft includes the male connector and the disconnect assembly element includes the female connector, and the male connector includes a plurality of mating regions, and at least one ramp region is defined at a trailing axial end of each of the plurality of mating regions.

16. The method according to claim 15, wherein the male connector and the female connector each include four mating regions that are complementary to each other.

17. The method according to claim 15, wherein the disconnect assembly element comprises a cup-shaped housing element.

18. The method according to claim 15, wherein the disconnect assembly element and the shaft are configured to be connected to each other manually.

* * * * *